US012753653B2

(12) United States Patent
Luckett

(10) Patent No.: US 12,753,653 B2
(45) Date of Patent: Oct. 6, 2026

(54) WINDOW PROTECTIVE SYSTEMS

(71) Applicant: Patrick Luckett, St. Louis, MO (US)

(72) Inventor: Patrick Luckett, St. Louis, MO (US)

( * ) Notice: Subject to any disclaimer, the term of this patent is extended or adjusted under 35 U.S.C. 154(b) by 130 days.

(21) Appl. No.: 18/787,187

(22) Filed: Jul. 29, 2024

(65) Prior Publication Data

US 2025/0179868 A1 Jun. 5, 2025

Related U.S. Application Data

(60) Provisional application No. 63/605,651, filed on Dec. 4, 2023.

(51) Int. Cl.
*E06B 5/12* (2006.01)

(52) U.S. Cl.
CPC .................................... *E06B 5/12* (2013.01)

(58) Field of Classification Search
CPC .................................... E06B 5/12; E06B 9/02
USPC ............ 52/202, 64, 657; 49/55, 57; 160/90, 160/182; 248/354.4, 354.5
See application file for complete search history.

(56) References Cited

U.S. PATENT DOCUMENTS

| | | | | | |
|---|---|---|---|---|---|
| 411,945 | A * | 10/1889 | Weber | E04F 21/0007 | 296/72 |
| 498,916 | A * | 6/1893 | Meyer | E06B 9/01 | 49/54 |
| 524,040 | A * | 8/1894 | Godwin | E06B 9/02 | 49/55 |
| 560,937 | A * | 5/1896 | Ryan | E06B 9/00 | 49/55 |
| 688,623 | A * | 12/1901 | Forry | F16M 11/00 | 248/164 |
| 958,481 | A * | 5/1910 | Drinkwater | E06B 7/082 | 49/55 |
| 994,754 | A * | 6/1911 | Kotzki | E06B 9/01 | 211/88.03 |
| 1,172,355 | A * | 2/1916 | Guest | E04G 1/20 | 405/148 |
| 1,298,072 | A * | 3/1919 | McNabney et al. | E06B 11/02 | 256/73 |
| 1,345,967 | A * | 7/1920 | Smelser | E06B 7/18 | 49/318 |
| 1,561,470 | A * | 11/1925 | Kihm | E06B 9/522 | 160/381 |
| 1,571,661 | A * | 2/1926 | Descoteau | A47C 7/002 | 160/373 |
| 1,733,214 | A * | 10/1929 | Alexander | A47F 7/18 | 211/180 |
| 1,891,588 | A * | 12/1932 | Claus | E06B 9/02 | 410/151 |
| 2,025,161 | A * | 12/1935 | Franklin | E06B 5/12 | 52/291 |

(Continued)

*Primary Examiner* — James M Ference

(57) ABSTRACT

A device that can be mounted inside a window frame for protection during hurricanes and tornadoes instead of hanging plywood. The “XFrame” has two adjustable metal rods (able to adjust the length of the bars to fit in a window frame). The two bars may be bolted together in the middle and adjustable at an angle, such that a user can adjust both the length of the bars and the angles to make them fit into virtually any size window frame. The user may adjust the bars to fit approximately inside the window frame and then engage the tension mechanism to lock them in place tightly.

15 Claims, 11 Drawing Sheets

(56) References Cited

U.S. PATENT DOCUMENTS

| | | | | | | |
|---|---|---|---|---|---|---|
| 2,082,012 | A | * | 6/1937 | Leffland | E06B 9/01 | 52/645 |
| 2,122,155 | A | * | 6/1938 | Schlatt | E06B 9/52 | 52/291 |
| 2,183,135 | A | * | 12/1939 | Dorf | E06B 9/01 | 49/57 |
| 2,201,266 | A | * | 5/1940 | Hutchinson | E06B 9/01 | 52/645 |
| 2,562,428 | A | * | 7/1951 | Hutchinson | E06B 9/01 | 160/161 |
| 2,679,467 | A | * | 5/1954 | Hervey | E06B 5/12 | 49/141 |
| 2,698,656 | A | * | 1/1955 | Levey | E06B 9/01 | D25/48.8 |
| 2,721,157 | A | * | 10/1955 | Martin | B32B 17/10036 | 52/456 |
| 2,777,174 | A | * | 1/1957 | Carr | E06B 9/04 | 49/61 |
| 2,794,217 | A | * | 6/1957 | Croft | E06B 5/12 | 248/200.1 |
| 2,837,783 | A | * | 6/1958 | Smirnoff | E06B 3/68 | 52/657 |
| 2,842,408 | A | * | 7/1958 | Symons | E04G 1/14 | 52/645 |
| 3,367,080 | A | * | 2/1968 | Mcclelland | E04G 5/16 | 52/645 |
| 3,763,918 | A | * | 10/1973 | Clark | E06B 9/52 | 29/897.3 |
| 3,942,576 | A | * | 3/1976 | Rickard | E06B 7/03 | D25/48.8 |
| 4,017,152 | A | * | 4/1977 | Allen | G03B 21/58 | 248/165 |
| 4,149,342 | A | * | 4/1979 | Bowers | E06B 9/01 | 49/55 |
| 4,267,682 | A | * | 5/1981 | Fowler | E04B 1/08 | 403/231 |
| 4,384,436 | A | * | 5/1983 | Green | E06B 9/01 | 52/509 |
| 4,432,162 | A | * | 2/1984 | Foote | E06B 9/02 | 49/55 |
| 4,590,706 | A | * | 5/1986 | Plowman | E06B 5/12 | 49/57 |
| 4,723,388 | A | * | 2/1988 | Zieg | E06B 3/685 | 52/456 |
| 4,728,066 | A | * | 3/1988 | Lang | F16M 11/046 | 211/186 |
| 4,763,865 | A | * | 8/1988 | Danner | G10G 5/00 | 108/118 |
| 4,974,525 | A | * | 12/1990 | Sheffield | A47B 3/12 | 108/118 |
| 5,024,407 | A | * | 6/1991 | Bartley | H04R 1/026 | 248/164 |
| 5,272,840 | A | * | 12/1993 | Knoedler | E06B 9/04 | 49/55 |
| 5,301,910 | A | * | 4/1994 | Lang | F16M 11/38 | 248/676 |
| 5,406,732 | A | * | 4/1995 | Peterson | F41A 23/08 | 248/164 |
| 5,446,996 | A | * | 9/1995 | Lamont | E06B 9/02 | 49/55 |
| 5,454,203 | A | * | 10/1995 | Turner | E04C 3/292 | 52/657 |
| 5,457,921 | A | * | 10/1995 | Kostrzecha | E06B 9/02 | 52/798.1 |
| 5,507,118 | A | * | 4/1996 | Brown | E05C 1/02 | 248/173 |
| 5,568,832 | A | * | 10/1996 | Eddy | E04D 13/033 | 160/369 |
| 5,673,883 | A | * | 10/1997 | Figueroa, Jr. | E04G 21/241 | 248/200.1 |
| 5,716,041 | A | * | 2/1998 | Groves | E06B 11/02 | 49/55 |
| 5,911,188 | A | * | 6/1999 | Kendziera | B63B 19/00 | 114/361 |
| 5,924,242 | A | * | 7/1999 | Macari | E06B 9/02 | 49/55 |
| 5,930,932 | A | * | 8/1999 | Peterson | F41A 23/16 | 42/94 |
| 5,937,593 | A | * | 8/1999 | White | E06B 9/02 | 52/106 |
| 5,943,832 | A | * | 8/1999 | Russell | E06B 9/00 | 52/645 |
| 6,029,401 | A | * | 2/2000 | Gale | E06B 7/082 | 49/465 |
| 6,293,059 | B1 | * | 9/2001 | Goodwin | E06B 9/02 | 52/712 |
| 6,330,768 | B1 | * | 12/2001 | Rodrigues | E06B 5/12 | 248/354.3 |
| 6,371,422 | B1 | * | 4/2002 | St. Martin | E06B 9/02 | 410/151 |
| 6,408,592 | B1 | * | 6/2002 | Hourani | E04C 3/16 | 52/456 |
| 6,637,608 | B1 | * | 10/2003 | Schneider | A47F 5/13 | 211/195 |
| 6,640,509 | B2 | * | 11/2003 | Clewis | E06B 9/02 | 248/200.1 |
| 6,910,312 | B2 | * | 6/2005 | Whitworth | E06B 9/02 | 52/127.2 |
| 6,978,579 | B1 | * | 12/2005 | Trinca | E06B 9/02 | 52/456 |
| 7,243,463 | B1 | * | 7/2007 | Lucero | E06B 9/02 | 49/55 |
| 7,275,731 | B1 | * | 10/2007 | Shinault | E04G 25/06 | 248/354.5 |
| 7,305,800 | B1 | * | 12/2007 | Calfee | E06B 9/02 | 52/203 |
| 7,469,502 | B1 | * | 12/2008 | Steel | E06B 9/02 | 49/463 |
| 7,614,187 | B1 | * | 11/2009 | Forbes | E06B 9/02 | 410/151 |
| 7,988,137 | B2 | * | 8/2011 | Johnson | F16M 11/28 | 248/164 |
| 8,031,400 | B2 | * | 10/2011 | Wang | G03B 21/58 | 359/461 |
| 8,955,247 | B2 | * | 2/2015 | Sargent | F41A 23/10 | 248/188 |
| 9,267,641 | B2 | * | 2/2016 | Gillespie-Brown | F16M 11/28 | |
| 10,322,690 | B2 | * | 6/2019 | Wang | A01K 1/0272 | |
| 10,683,686 | B2 | * | 6/2020 | Brown | E05C 17/30 | |
| 11,305,207 | B2 | * | 4/2022 | Clevinger | A63H 29/22 | |
| 2002/0017065 | A1 | * | 2/2002 | Clewis | E06B 9/02 | 52/203 |
| 2010/0146881 | A1 | * | 6/2010 | Framer | E06B 9/02 | 52/202 |
| 2017/0275932 | A1 | * | 9/2017 | Brown | E05C 17/30 | |
| 2025/0179868 | A1 | * | 6/2025 | Luckett | E06B 5/12 | |

* cited by examiner

WINDOW PROTECTIVE SYSTEMS

CROSS-REFERENCE TO RELATED APPLICATION

The present application is related to and claims priority from prior provisional application Ser. No. 63/605,651, filed Dec. 4, 2023 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of windows and more specifically relates to protection means for windows.

2. Description of the Related Art

Many areas of the country and of the world experience harsh weather from time to time that may cause damage to persons and property. Many people try to affix something protective over windows, doors and the like at the last minute before the storm to prevent breakage and damage. Damages may be inconvenient and expensive. Many elderly individuals have trouble installing protective means. It is desirable that a means to easily install sufficient protection be forthcoming.

Various attempts have been made to solve the above-mentioned problems such as those found in U.S. Pub. No. 2010/0146881 to Benn Framer et al., This art is representative of protection means for windows. None of the above inventions and patents, taken either singly or in combination, is seen to describe the invention as claimed.

Ideally, a window protective system should provide effective and efficient protection means for windows and, yet would operate reliably and be manufactured at a modest expense. Thus, a need exists for a reliable window protective system to avoid the above-mentioned problems.

BRIEF SUMMARY OF THE INVENTION

In view of the foregoing disadvantages inherent in the known window art, the present invention provides a novel window protective system. The general purpose of the present invention, which will be described subsequently in greater detail is to provide an efficient and effective means, that is re-usable for protecting windows that is easy to install. The present invention is a device that can be mounted inside a paned window and/or door frame for protection during hurricanes and tornadoes instead of hanging plywood.

A window protective system is disclosed herein, in a preferred embodiment, comprising: a window protective assembly including at least one extender rod, at least one brace, at least one wedge, and a shield, wherein the window protective assembly comprises the at least one extender rod, the at least one brace, the at least one wedge, and the shield in functional combination to provide custom-fit protection against environmental elements for a host exterior-to-interior opening. The host exterior-to-interior opening comprises a framed window and alternately a framed door with at least one pane.

The at least one extender rod comprises at least two of the extender rods; the extender rods able to rotate in relation to each other (in a scissoring motion) via at least one base, the at least one base having a fastener passed through such as to allow rotation, when desired to enable the custom-fit protection. The extender rods are able to be manipulated into an X configuration. The at least one brace is adjustable and is connected to the extender rods to support the X configuration during an in-use condition when providing the custom-fit protection. The at least one brace is removably couplable to the extender rods via a bolt and nuts.

The at least one wedge comprises exactly four of the wedges, in preferred embodiments, each affixed at opposing end of the extender rods. The bolt passes through the at least one brace and the extender rod and the nut is coupled with the bolt to combine the at least one brace and the extender rod for use. The at least one brace is able to be lengthened and shortened via adjustment. The shield is affixable to the extender rods; wherein the shield is adjacent to a pane when used. The shield comprises flexible material, wherein the flexible material may comprise rubber. The wedges comprise the flexible material, also preferably rubber or similar type material.

In more detail, the "XFrame" has two adjustable metal rods (able to adjust the length of the bars to fit in a window frame). The two bars may be bolted together in the middle and adjustable at an angle, such that a user can adjust both the length of the bars and the angles to make them fit into virtually any size window frame. Once it is mounted, it looks like an X inside the window frame.

The ends of the bars preferably have some dense padding that looks like an arrow so that the ends of each bar are able to fit snugly inside the corners of the window frame, and the padding prevents damage to the home.

There may also be a lip on the padding to effectively ensure it stayed locked in place when outside force was applied (debris). There is preferably a tension mechanism to hold the bars in place. The user may adjust the bars to fit approximately inside the window frame and then engage the tension mechanism to lock them in place tightly.

Lastly, there may be a flexible elastomeric shield that the user attaches to the bars to prevent debris from hitting the window. This device need only be purchased once for each window, is lightweight, and is able to be mounted in a short time duration.

A kit is also disclosed herein including: the window protective assembly including the at least one extender rod, the at least one brace, the at least one wedge, the shield, and the bolts and nuts, and a set of user instructions.

A method of using a window protective system is also described comprising the steps of: providing the window protective system comprising the window protective assembly including the at least one extender rod, the at least one brace, the at least one wedge, the shield, and the bolts and nuts, mounting the window protective assembly adjacent a pane to be protected against environmental elements for a host exterior-to-interior opening, the shield adjacent to the pane, adjusting the at least one brace such that the wedges are located tight inside respective corners of the host exterior-to-interior opening, and tightening the nuts and bolts to a suitable positioning for an in-use condition. The method may further comprise the step of removing the window protective system when desired.

The present invention holds significant improvements and serves as a window protective system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and in distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, window protective system, constructed and operative according to the teachings of the present invention.

The various embodiments of the present invention will hereinafter be described in conjunction with the appended drawings, wherein like designations denote like elements.

DETAILED DESCRIPTION

Figure 1:
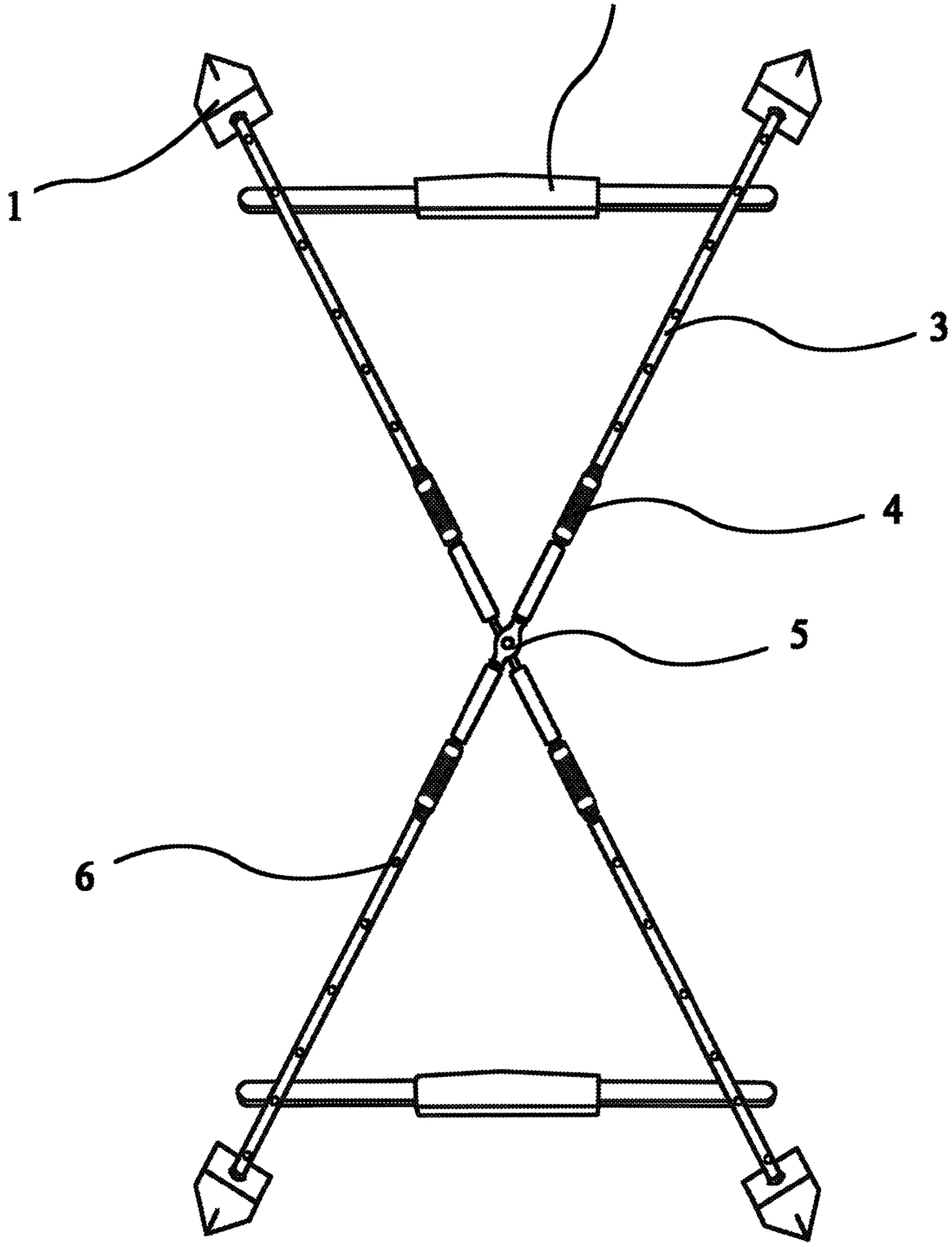
FIG. 1 shows a front view illustrating a window protective system according to an embodiment of the present invention.
Figure 2:
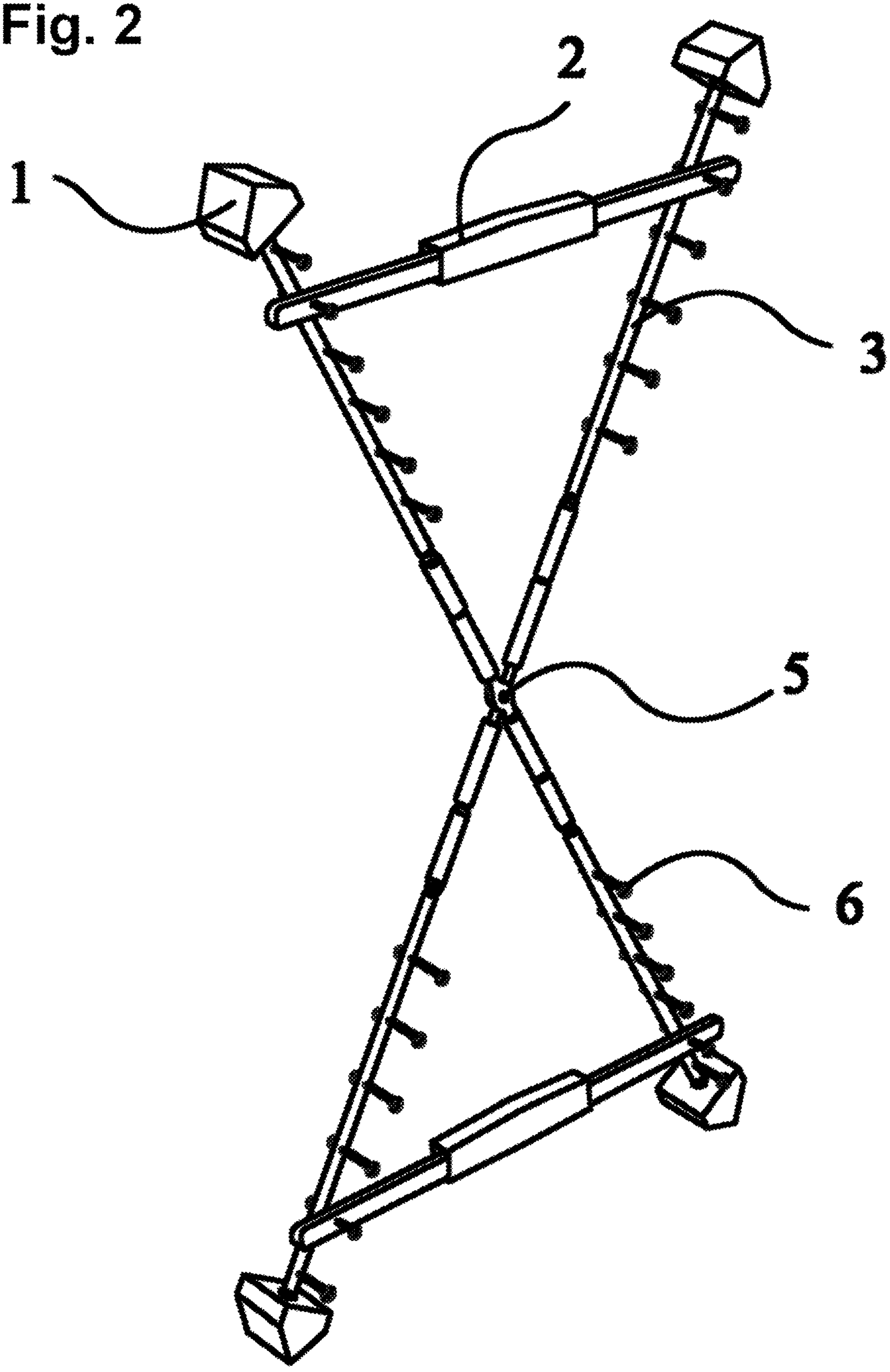
FIG. 2 is a back view illustrating the window protective system according to an embodiment of the present invention of FIG. 1.
Figure 3:
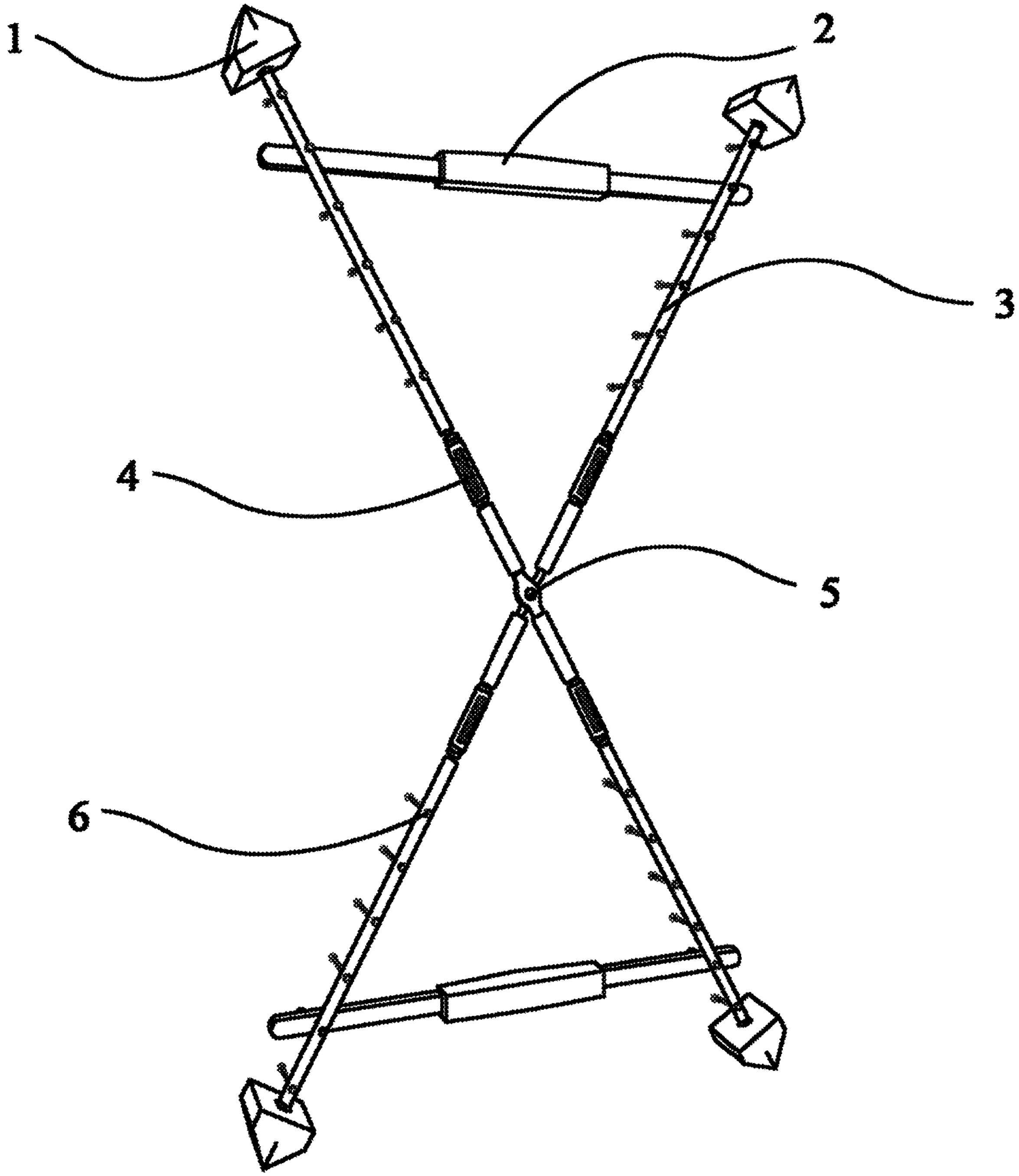
FIG. 3 is a front view illustrating the window protective system according to an embodiment of the present invention of FIG. 1.
Figure 4:
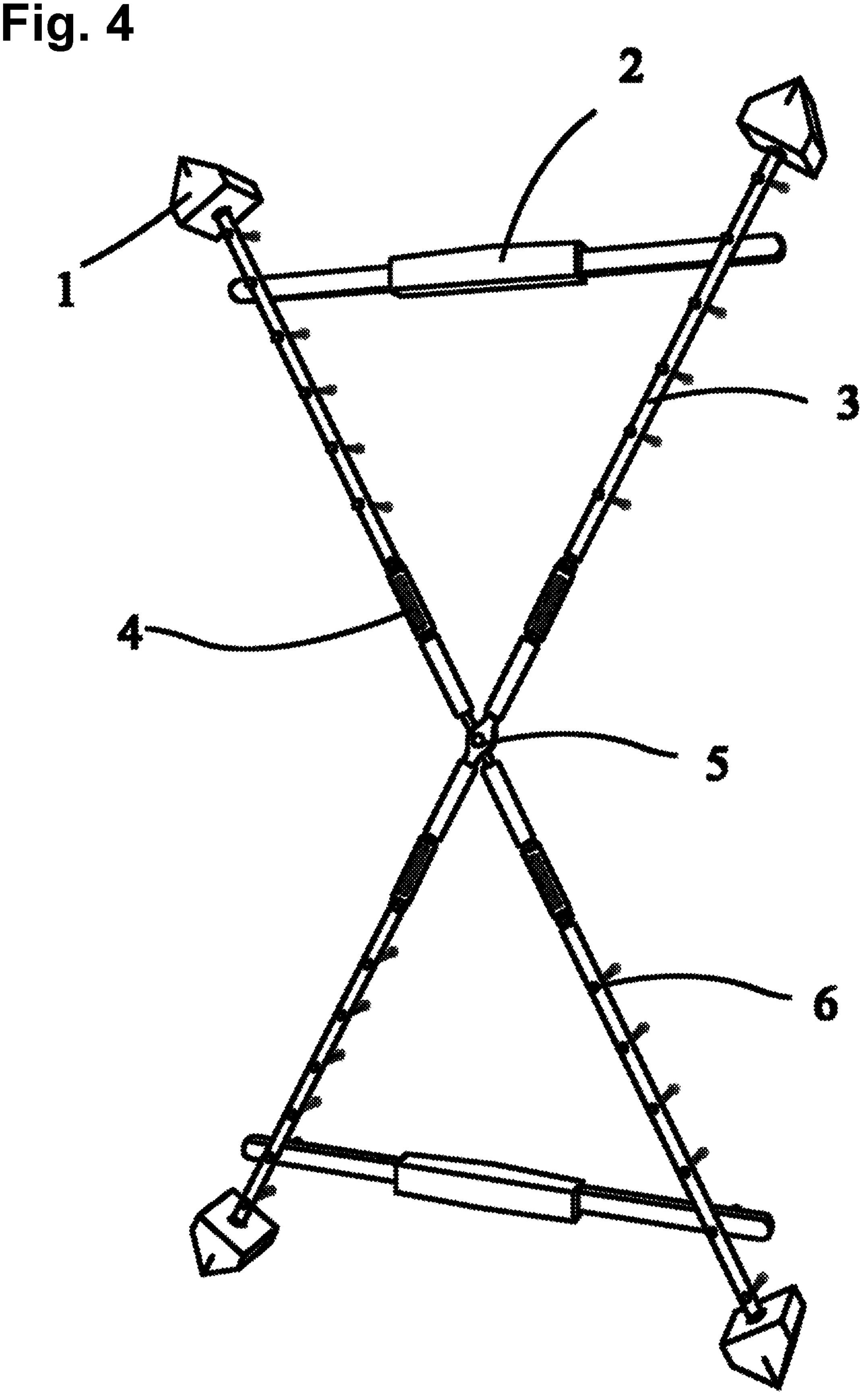
FIG. 4 is a front view illustrating the window protective system according to an embodiment of the present invention of FIG. 1.
Figure 5:
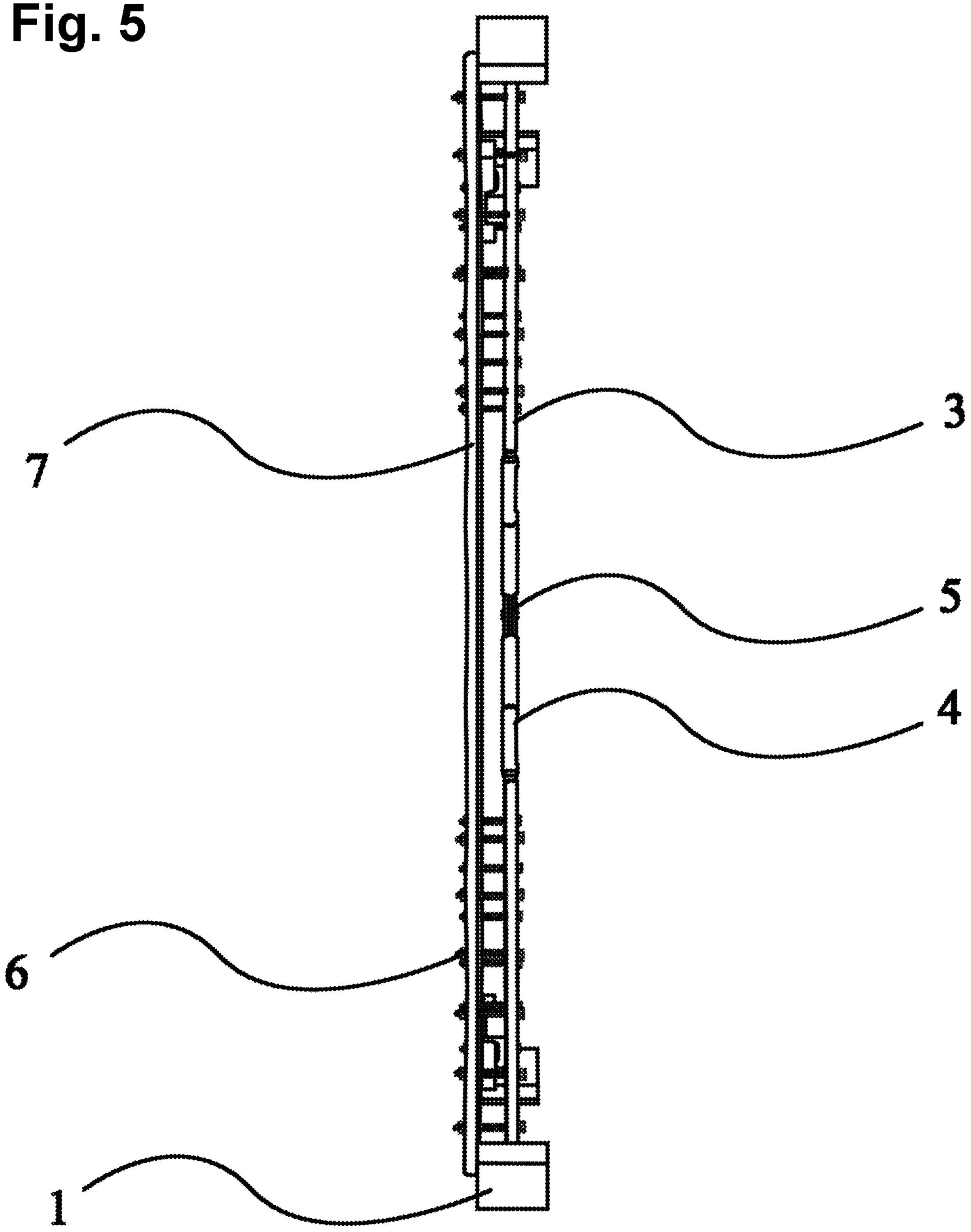
FIG. 5 is a side view illustrating the window protective system according to an embodiment of the present invention of FIG. 1.
Figure 6:
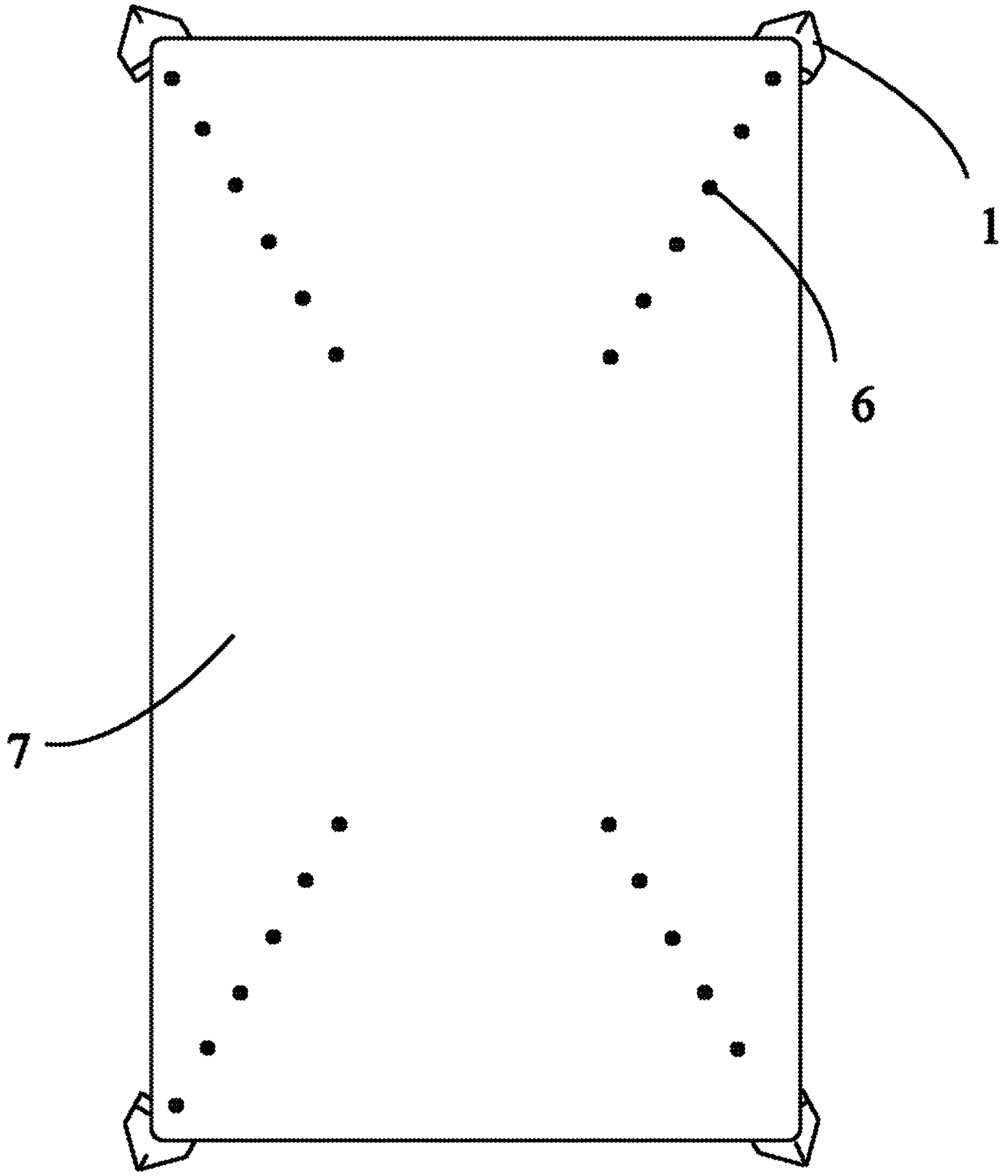
FIG. 6 is a front view illustrating a shield of the window protective system according to an embodiment of the present invention of FIG. 1.
Figure 7:
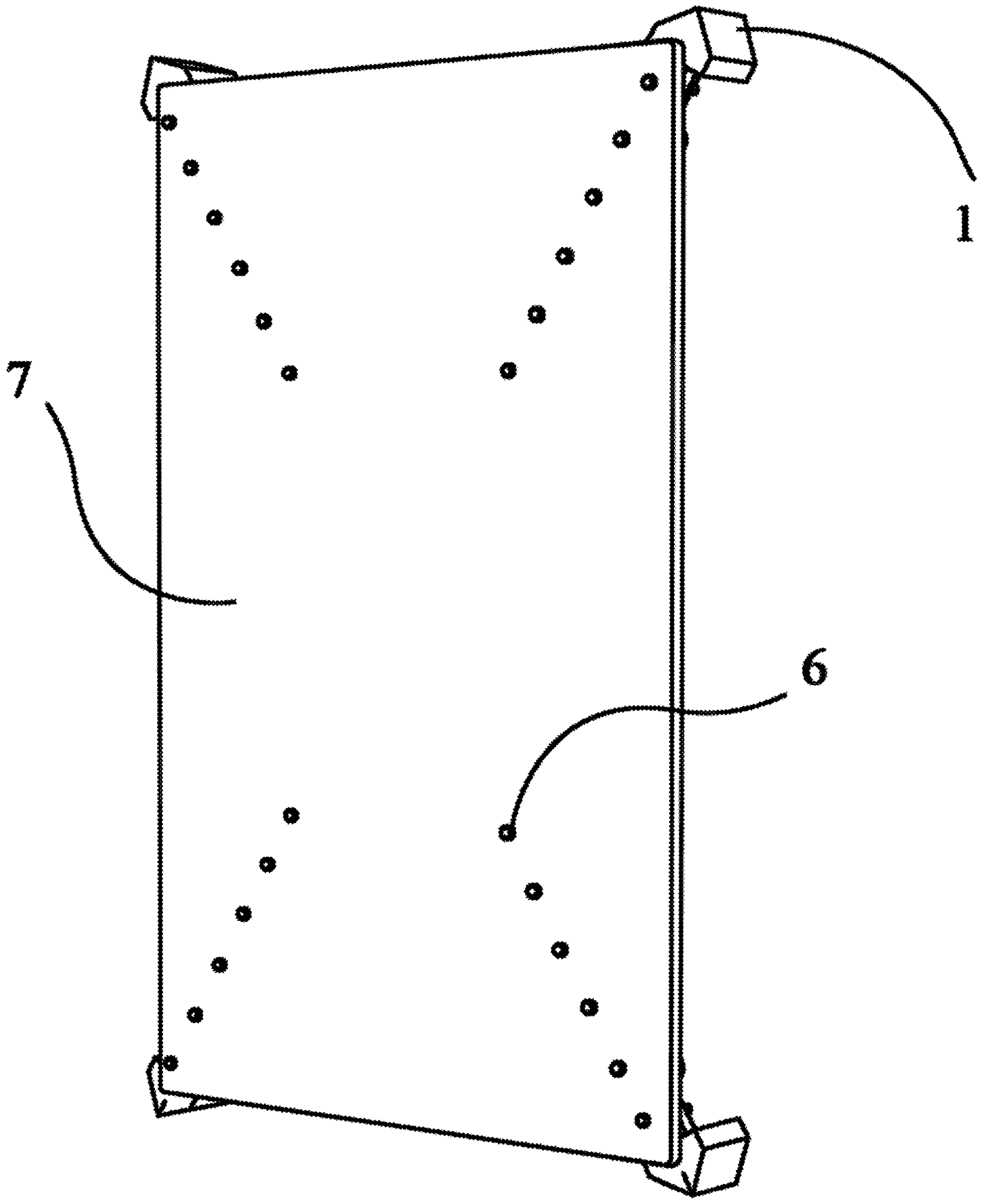
FIG. 7 is a front perspective view illustrating the shield of the window protective system according to an embodiment of the present invention of FIG. 1.
Figure 8:
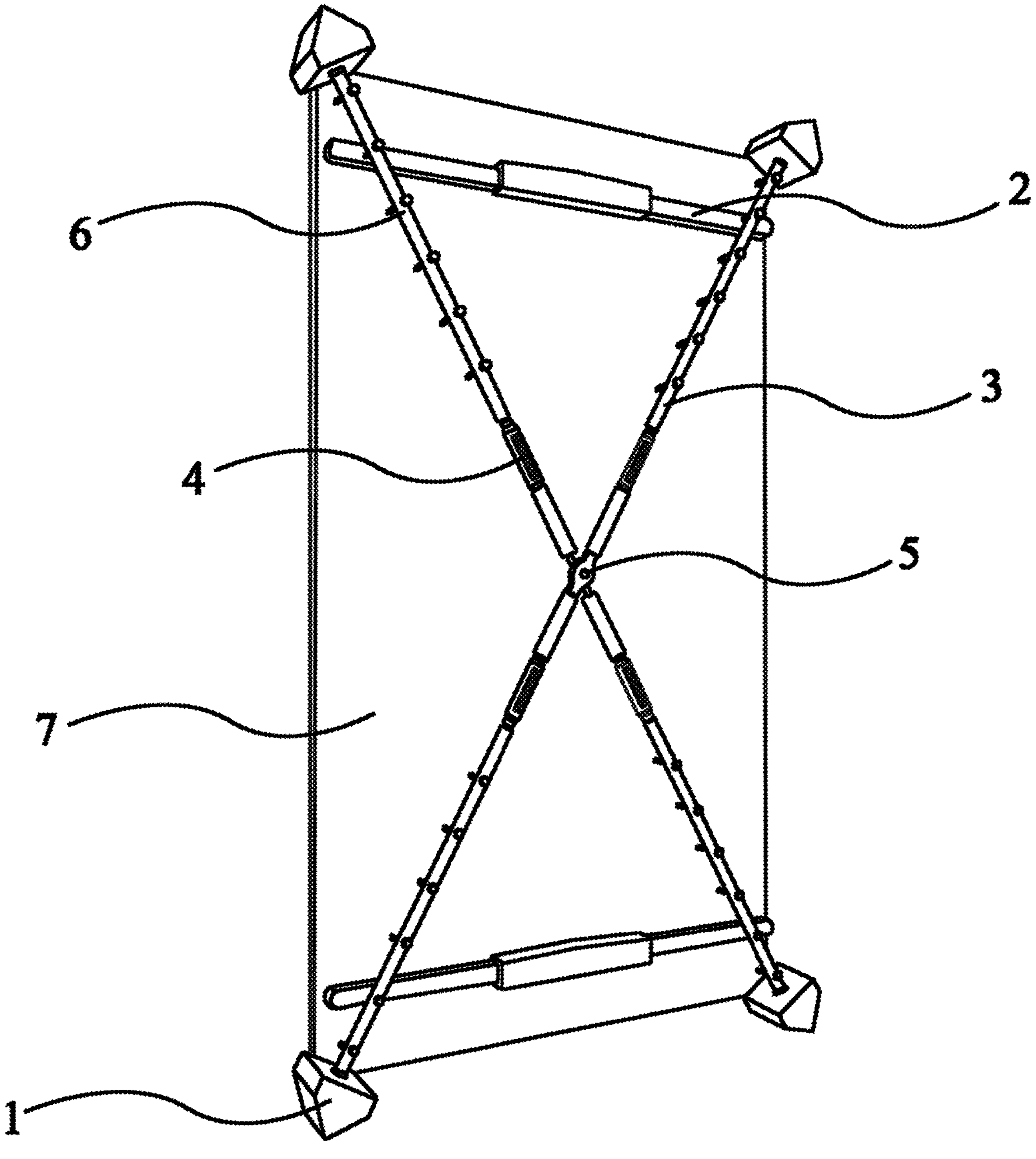
FIG. 8 is a back perspective view illustrating shield of the window protective system according to an embodiment of the present invention of FIG. 1.
Figure 9:
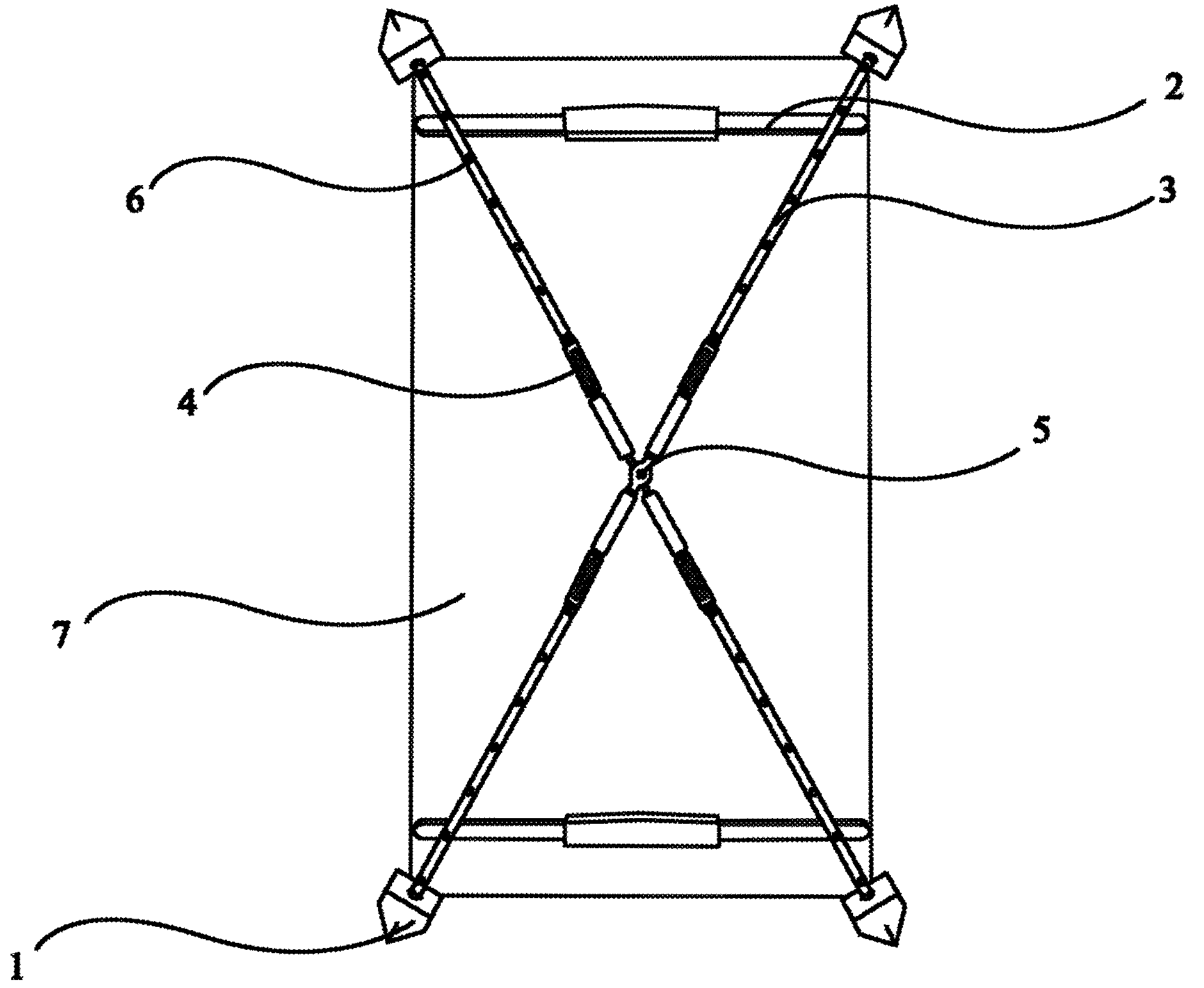
FIG. 9 is a back view illustrating the shield of the window protective system according to an embodiment of the present invention of FIG. 1.

As discussed above, embodiments of the present invention relate to a window protection means and more particularly to a window protective system as used to improve the efficiency and effectiveness for protecting windows during inclement periods.

The present invention is a device that can be mounted inside a window frame for protection during hurricanes and tornadoes instead of hanging plywood. The working name is "XFrame" with two adjustable metal rods (able to adjust the length of the bars to fit in a window frame). The two bars may be bolted together in the middle and adjustable at an angle, such that a user can adjust both the length of the bars and the angles to make them fit into virtually any size window frame. Once it is mounted, it looks like an X inside the window frame. The ends of the bars preferably have some dense padding that looks like an arrow so that the ends of each bar are able to fit snugly inside the corners of the window frame, and the padding prevents damage to the home. There may also be a lip on the padding to effectively ensure it stayed locked in place when outside force was applied (debris). There is preferably a tension mechanism to hold the bars in place. The user may adjust the bars to fit approximately inside the window frame and then engage the tension mechanism to lock them in place tightly. Lastly, there may be a flexible elastomeric shield that the user attaches to the bars to prevent debris from hitting the window. This device would only need to be purchased once for each window, is lightweight, and could be mounted in approximately the same amount of time it takes to mount a tension bar for a shower curtain.

Referring to the drawings by numerals of reference there is shown in FIG. 1-9, a window protective system comprising the following components: wedge 1—sits inside the corner of the window frame. It holds the window protective system in place; brace 2—provides added support to the whole system by holding extender rod 3 in place; extender rod 3; connector 4—connects the extender to the base 5; base 5—the central part that holds everything together; bolt and nuts 6—locks the shield 7 to the extender rod 3; and shield 7—Cover the mounts on the frame to protect from debris. It is preferably made of flexible rubber.

A window protective system comprises a window protective assembly including at least one extender rod 3, at least one brace 2, at least one wedge 1, and a shield 7, wherein the window protective assembly comprises the at least one extender rod 3, the at least one brace 2, the at least one wedge 1, and the shield 7 in functional combination to provide custom-fit protection against environmental elements for a host exterior-to-interior opening. The host exterior-to-interior opening may comprise a framed window with at least one pane and alternately a framed door with at least one pane.

The at least one extender rod 3 comprises at least two of the extender rods 3; the extender rods 3 able to rotate in relation to each other via at least one base 5, the at least one base 5 having a fastener passed through such as to allow rotation, when desired to enable the custom-fit protection.

The extender rods 3 are able to be manipulated into an X configuration, as shown in FIGS. 1-4.

The at least one brace 2 of the window protective system is adjustable and is connected to the extender rods 3 to support the X configuration during an in-use condition when providing the custom-fit protection; wherein the at least one brace 2 is removably couplable to the extender rods 3 via a bolt and nuts 6. The at least one wedge 1 comprises at least two of the wedges 1, each affixed at an opposing end of the extender rods 3. The at least one wedge 1 comprises four wedges 1 in preferred embodiments, as shown. The bolt passes through the at least one brace 2 and the extender rod 3 and the nut is coupled with the bolt to combine the at least one brace 2 and the extender rod 3 for use. The at least one brace 2 is able to be lengthened and shortened via adjustment.

The shield 7 is affixable to the extender rods 3; wherein the shield 7 is adjacent to a pane (of the host window or door) when used. The shield 7 preferably comprises flexible material such as rubber or the like (suitable equivalent). The wedges 1 also preferably comprise flexible material. Upon reading this specification, it should be appreciated that, under appropriate circumstances, considering such issues as user preferences, design preference, structural requirements, marketing preferences, cost, available materials, technological advances, etc., other material arrangements such as, for example, non-rubber, composites, etc., may be sufficient. The various components of the present system may comprise ferrous and non-ferrous materials as suitable.

A kit has the above-named components (the window protective assembly including the at least one extender rod 3, the at least one brace 2, the at least one wedge 1, the shield 7, and the bolts and nuts 6) and instructions such that functional relationships are detailed in relation to the structure of the invention (such that the invention can be used, maintained, or the like in a preferred manner). The kit may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

A method of using a window protective system may comprise the steps of: step one providing the window protective system comprising the window protective assembly including the at least one extender rod, the at least one brace, the at least one wedge, the shield, and the bolts and nuts, step two mounting the window protective assembly adjacent a pane to be protected against environmental elements for a host exterior-to-interior opening, the shield adjacent to the pane, step three adjusting the at least one brace such that the wedges are located tight inside respective corners of the host exterior-to-interior opening, and step four tightening the nuts and bolts to a suitable positioning for an in-use condition. The method may further comprise the step five of removing the window protective system when desired. The user may install the device according to the method of use described above and storing for a future use.

Figure 10:
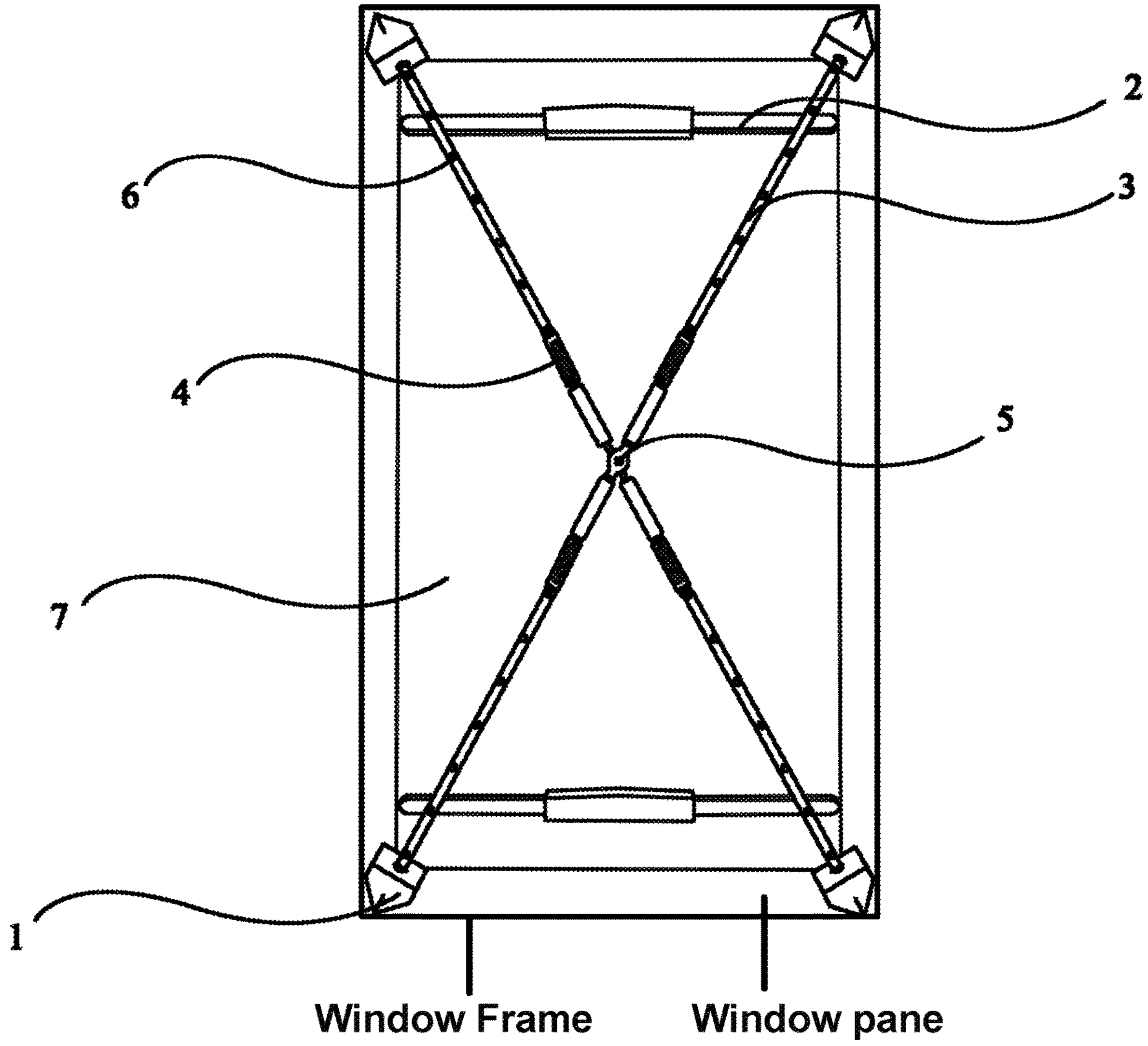
FIG. 10 is a front view illustrating the window protective system installed in a host exterior-to-interior opening according to an embodiment of the present invention of FIG. 1.

Referring to FIG. 10, the window protective system is shown installed in a host exterior-to-interior opening. The wedges 1 are located tight inside respective corners of the host exterior-to-interior opening. The extender rods 3 are manipulated into the X configuration. The brace 2 is adjusted such that the wedges 1 are located tight inside respective corners of the host exterior-to-interior opening. The shield 7 is adjacent to the pane of the host exterior-to-interior opening, providing custom-fit protection against environmental elements. The window protective system may be removed when desired.

Figure 11:
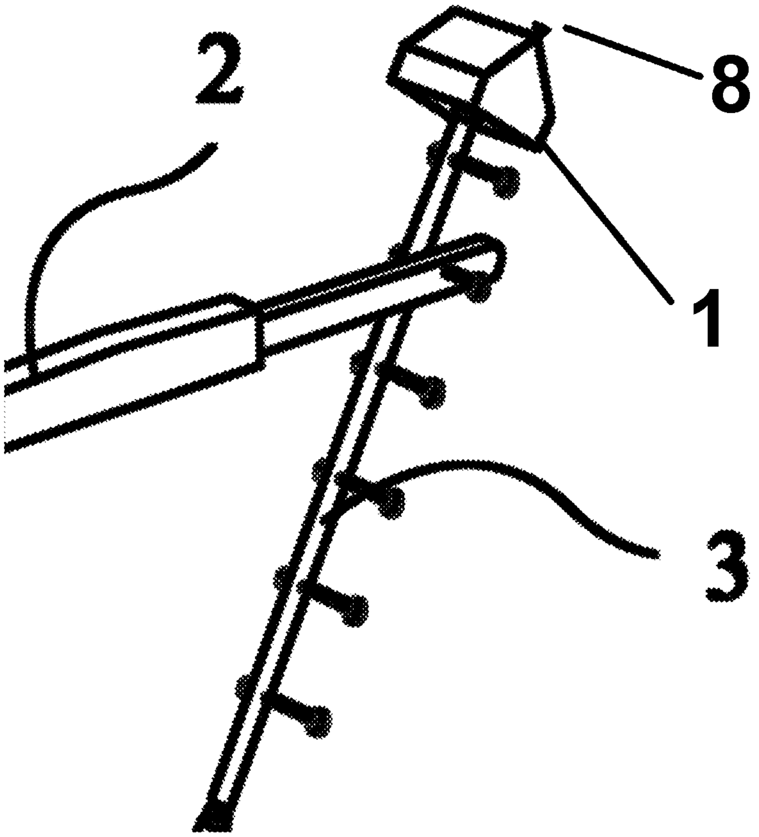
FIG. 11 is a detail view of a wedge illustrating the lip feature according to an embodiment of the present invention.

Referring to FIG. 11, the wedge 1 is shown in detail at the end of the extender rod 3 adjacent the brace 2. The wedge 1 includes a lip 8 that extends outwardly from the body of the wedge 1. The lip 8 is configured to sit on the outside of the host exterior-to-interior opening and to resist displacement when an outside force is applied, thereby serving as a backup anchor to prevent the window protective assembly from being pushed inward by wind or debris during use. The lip 8 and the wedge 1 comprise flexible elastomeric material.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A window protective system comprising:

a window protective assembly including, at least one extender rod;

at least one brace;

at least one wedge, each said at least one wedge comprising a flexible elastomeric material and having a lip configured to resist displacement when an outside force is applied;

a shield comprising a flexible elastomeric material; and wherein said window protective assembly comprises said at least one extender rod, said at least one brace, said at least one wedge, and said shield in a functional combination to provide a custom-fit protection against environmental elements for a host exterior-to-interior opening;

wherein said at least one extender rod comprises at least two of said extender rods, said extender rods configured to rotate in relation to each other via at least one base, said at least one base having a fastener passed through such as to permit rotation, when desired to enable said custom-fit protection;

wherein said extender rods are configured to be manipulated into an X configuration;

wherein said at least one brace is adjustable and is connected to said extender rods to support said X configuration during an in-use condition when providing said custom-fit protection; and wherein said window protective assembly is mountable within said host exterior-to-interior opening without permanent modification to said host exterior-to-interior opening.

2. The window protective system of claim 1 wherein said host exterior-to-interior opening comprises a framed window with at least one pane.

3. The window protective system of claim 1 wherein said host exterior-to-interior opening comprises a framed door with at least one pane.

4. The window protective system of claim 1 wherein said at least one brace is removably couplable to said extender rods via a bolt and nuts.

5. The window protective system of claim 4 wherein said at least one wedge comprises at least two of said wedges, each affixed at an opposing end of said extender rods.

6. The window protective system of claim 5 wherein said at least two wedges comprises four said wedges.

7. The window protective system of claim 4 wherein said bolt passes through said at least one brace and said extender rod and said nut is coupled with said bolt to combine said at least one brace and said extender rod for use.

8. The window protective system of claim 7 wherein said at least one brace is configured to be lengthened and shortened via an adjustment.

9. The window protective system of claim 8 wherein said shield is affixable to said extender rods.

10. The window protective system of claim 9 wherein said shield is adjacent to a pane when in the in-use condition.

11. The window protective system of claim 10 wherein said elastomeric material comprises rubber, polyurethane, silicone, neoprene, or thermoplastic elastomer.

12. A method of using the window protective system of claim 1 comprising steps of:

providing the window protective system of claim 1 and bolts and nuts;

manipulating said extender rods into an X configuration;

mounting the window protective assembly adjacent a pane to be protected against environmental elements for the host exterior-to-interior opening, the shield adjacent to the pane;

adjusting the at least one brace such that said at least one brace supports said X configuration and the wedges are located tight inside respective corners of the host exterior-to-interior opening; and tightening the nuts and bolts to a suitable positioning for the in-use condition;

wherein the window protective assembly is mounted without permanent modification to the host exterior-to-interior opening.

13. The method of claim 12 further comprising a step of removing the window protective system when desired.

14. A window protective system comprising:

a window protective assembly including, at least one extender rod;

at least one brace;

at least one wedge; and a shield;

wherein said window protective assembly comprises said at least one extender rod, said at least one brace, said at least one wedge, and said shield in a functional combination to provide a custom-fit protection against environmental elements for a host exterior-to-interior opening;

wherein said host exterior-to-interior opening comprises a framed window or a framed door with at least one pane;

wherein said at least one extender rod comprises at least two of said extender rods, said extender rods configured to rotate in relation to each other via at least one base, said at least one base having a fastener passed through such as to permit rotation, when desired to enable said custom-fit protection;

wherein said extender rods are configured to be manipulated into an X configuration;

wherein said at least one brace is adjustable and is connected to said extender rods to support said X configuration during an in-use condition when providing said custom-fit protection;

wherein said at least one brace is removably couplable to said extender rods via a bolt and nuts;

wherein said at least one wedge comprises exactly four of said wedges, each affixed at opposing end of said extender rods, each said at least one wedge comprising a flexible elastomeric material and having a lip configured to resist displacement when an outside force is applied;

wherein said bolt passes through said at least one brace and said extender rod and said nut is coupled with said bolt to combine said at least one brace and said extender rod for use;

wherein said at least one brace is configured to be lengthened and shortened via an adjustment;

wherein said shield is affixable to said extender rods;

wherein said shield is adjacent to a pane when in the in-use condition;

wherein said shield comprises a flexible material;

wherein said flexible material comprises an elastomeric material;

wherein said wedges comprise said elastomeric material; and wherein said window protective assembly is mountable within said host exterior-to-interior opening without permanent modification to said host exterior-to-interion opening.

15. The window protective system of claim 14 further comprising a kit including:

said window protective assembly including said at least one extender rod, said at least one brace, said at least one wedge; said shield, and said bolts and nuts; and a set of user instructions.

* * * * *